(12) United States Patent
Johnson

(10) Patent No.: US 11,580,347 B2
(45) Date of Patent: Feb. 14, 2023

(54) CHIPLESS RFID FOR LIQUID LENS

(71) Applicant: CORNING INCORPORATED, Corning, NY (US)

(72) Inventor: Andrew Wesley Johnson, Santa Barbara, CA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/739,764

(22) Filed: May 9, 2022

(65) Prior Publication Data

US 2022/0261613 A1 Aug. 18, 2022

Related U.S. Application Data

(62) Division of application No. 17/091,830, filed on Nov. 6, 2020, now Pat. No. 11,366,996.

(60) Provisional application No. 62/938,054, filed on Nov. 20, 2019.

(51) Int. Cl.
*G06K 19/077* (2006.01)

(52) U.S. Cl.
CPC .............................. *G06K 19/07758* (2013.01)

(58) Field of Classification Search
CPC ................................................. G06K 19/07758
USPC ......................................................... 235/492
See application file for complete search history.

(56) References Cited

U.S. PATENT DOCUMENTS

| 6,330,971 B1 | 12/2001 | Mabry et al. |
| 8,322,626 B2 | 12/2012 | Kang et al. |
| 2009/0212953 A1 | 8/2009 | Ross-Messemer |
| 2015/0352587 A1 | 12/2015 | Ichino et al. |

FOREIGN PATENT DOCUMENTS

CN 101556903 A 10/2009

*Primary Examiner* — Allyson N Trail
(74) *Attorney, Agent, or Firm* — Tamika A. Crawl-Bey

(57) ABSTRACT

A liquid lens includes a substrate, an anti-reflection (AR) coating, and a chipless radio frequency identification (RFID) tag. The substrate includes central and peripheral portions. The AR coating is disposed on the substrate. The chipless RFID tag is disposed in the peripheral portion to uniquely identify the liquid lens.

6 Claims, 3 Drawing Sheets

CHIPLESS RFID FOR LIQUID LENS

CROSS REFERENCE TO RELATED APPLICATIONS

This application is a divisional of U.S. patent application Ser. No. 17/091,830 filed Nov. 6, 2020, which claims the benefit of priority under 35 U.S.C. § 119 of U.S. Provisional Application No. 62/938,054, filed Nov. 20, 2019, the content of each of which is incorporated herein by reference in its entirety.

BACKGROUND

Field

The present disclosure relates to liquid lens apparatuses and systems, for example, chipless radio frequency identification (RFID) liquid lens apparatuses and systems.

Background

Liquid lenses can be manufactured by microfabrication on wafers that are grouped into lots. Tracking individual wafers within each lot can be difficult. Maintaining accurate wafer tracking can involve manual or automated inspection of each wafer. Additionally, when a wafer is diced, tracking of the individual die of the wafer can be extremely difficult. Each die can include a unique identification (ID) mark. As a consequence, due to the small size of each die and number of dice per wafer, tracking of each individual die and, thus, each liquid lens can require substantial time and resources.

SUMMARY

Accordingly, there is a need for an RFID tag that can be integrated into a liquid lens and provide efficient and reliable tracking of the liquid lens throughout fabrication and packaging.

In some embodiments, a liquid lens includes a substrate, an anti-reflection (AR) coating, and a chipless radio frequency identification (RFID) tag. The substrate includes central and peripheral portions. The AR coating is disposed on the substrate. The chipless RFID tag is disposed in the peripheral portion to uniquely identify the liquid lens.

In some embodiments, the chipless RFID tag is embedded in the AR coating. In some embodiments, the chipless RFID tag is disposed on an exterior side of the AR coating. In some embodiments, the chipless RFID tag is disposed on an interior side of the AR coating.

In some embodiments, the central portion of the substrate includes a window. In some embodiments, the chipless RFID tag extends at least 180 degrees around the window.

In some embodiments, the chipless RFID tag includes a planar transmission line. In some embodiments, the chipless RFID tag includes a resonator. In some embodiments, the chipless RFID tag includes a plurality of different resonators each having a different resonant frequency. In some embodiments, the chipless RFID tag includes a planar conductor. In some embodiments, the chipless RFID tag includes a first antenna having a first polarization and a second antenna having a second polarization substantially orthogonal to the first polarization.

In some embodiments, a liquid lens tracking system includes an RFID reader disposed adjacent to a device configured to transport a liquid lens. The liquid lens includes a substrate including central and peripheral portions, an anti-reflection (AR) coating disposed on the substrate, and a chipless radio frequency identification (RFID) tag disposed in the peripheral portion to uniquely identify the liquid lens.

In some embodiments, the chipless RFID tag is embedded in the AR coating. In some embodiments, the chipless RFID tag includes a plurality of different resonators each having a unique resonant frequency. In some embodiments, the RFID reader is configured to send an interrogation signal to the chipless RFID tag and configured to receive an encoded signal from the chipless RFID tag based on one or more resonators. In some embodiments, the device includes a conveyor configured to transport the liquid lens to the RFID reader.

In some embodiments, a method includes first tracking, with a first RFID reader, a wafer with a first chipless radio frequency (RFID) tag. In some embodiments, the method further includes fabricating an array of liquid lenses using the wafer, the array comprising a liquid lens with a second chipless RFID tag. In some embodiments, the method further includes dicing the wafer into a plurality of dice, one of which comprises the liquid lens. In some embodiments, the method further includes second tracking, with a second RFID reader, the second chipless RFID tag. In some embodiments, the method further includes packaging the die. In some embodiments, the method further includes third tracking, with a third RFID reader, the die after packaging.

In some embodiments, the fabricating includes embedding the second chipless RFID tag in an anti-reflection (AR) coating of the liquid lens. In some embodiments, the fabricating includes forming a plurality of different resonators each having a unique resonant frequency in the second chipless RFID tag. In some embodiments, the first tracking includes tracking a plurality of wafers with a plurality of the first chipless RFID tags. In some embodiments, the second tracking includes tracking a plurality of dies with a plurality of the second chipless RFID tags. In some embodiments, the fabricating includes fabricating a different second chipless RFID tag into each liquid lens of the array of liquid lenses prior to dicing the wafer.

Further features and advantages of the disclosure, as well as the structure and operation of various embodiments of the disclosure, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

Figure 1:
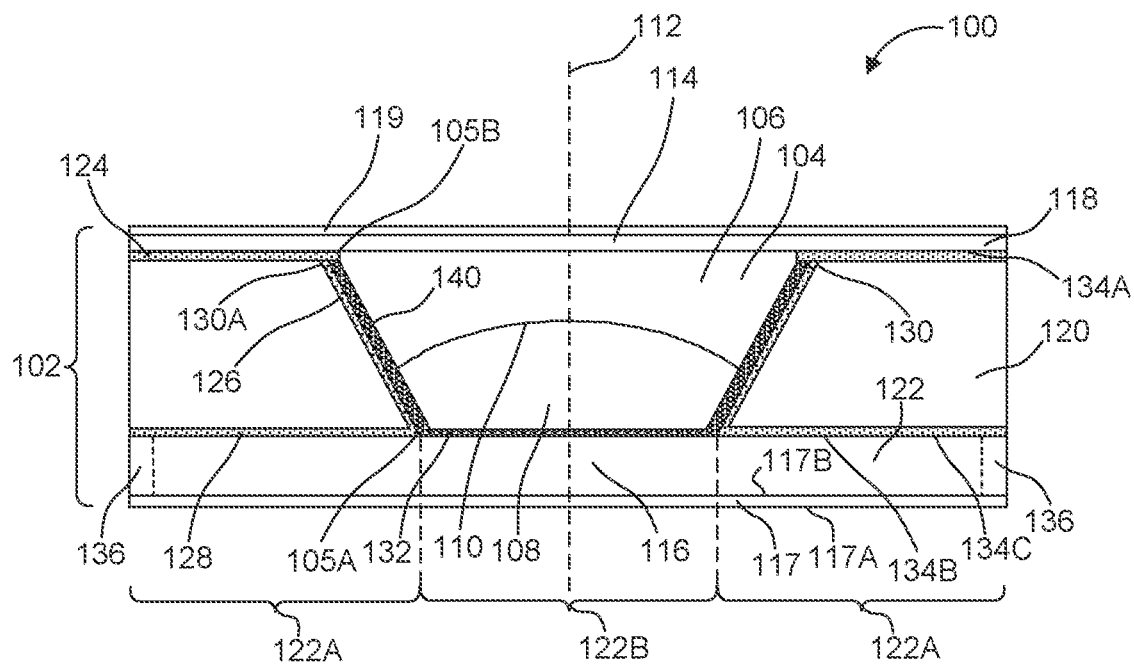
FIG. 1 is a schematic cross-sectional view of a liquid lens, according to exemplary embodiments.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of this disclosure. The disclosed embodiment(s) are merely exemplary. The scope of the disclosure is not limited to the disclosed embodiment(s), but rather is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper," and the like, may be used herein for ease of description to describe one element's or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about" or "substantially" as used herein indicates the value of a given quantity that can vary based on a particular technology. Based on the particular technology, the term "about" or "substantially" can indicate a value of a given quantity that varies within, for example, 1-15% of the value (e.g., ±1%, ±2%, ±5%, ±10%, or ±15% of the value).

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc.

Exemplary Liquid Lens

Liquid lenses generally include two immiscible liquids disposed within a cavity disposed between a first window and a second window. Varying an electric field to which the liquids are subjected can vary the wettability of one of the liquids with respect to the cavity wall, thereby varying the shape of the meniscus formed between the two liquids and, thus, changing the optical focal length of the liquid lens.

FIG. 1 illustrates a schematic cross-sectional view of liquid lens 100, according to exemplary embodiments. In some embodiments, liquid lens 100 can include a lens body 102 and a cavity 104 formed in the lens body 102. A first liquid 106 and a second liquid 108 can be disposed within cavity 104. In some embodiments, first liquid 106 can be a polar liquid or a conducting liquid. Additionally, or alternatively, second liquid 108 can be a non-polar liquid or an insulating liquid. In some embodiments, first liquid 106 and second liquid 108 have different refractive indices such that an interface 110 between first liquid 106 and second liquid 108 forms a lens. In some embodiments, first liquid 106 and second liquid 108 have substantially the same density, which can help to avoid changes in the shape of interface 110 as a result of changing the physical orientation of liquid lens 100 (e.g., as a result of gravitational forces).

In some embodiments, first liquid 106 and second liquid 108 can be in direct contact with each other at interface 110. For example, first liquid 106 and second liquid 108 can be substantially immiscible with each other such that the contact surface between first liquid 106 and second liquid 108 defines interface 110. In some embodiments, first liquid 106 and second liquid 108 can be separated from each other at interface 110. For example, first liquid 106 and second liquid 108 can be separated from each other by a membrane (e.g., a polymeric membrane) that defines interface 110.

Interface 110 can be adjusted via electrowetting. Electrowetting is a modification of the wetting properties or wettability (e.g., ability of a liquid to maintain contact with a surface) of a surface with an applied electric field. For example, a voltage can be applied between first liquid 106 and a surface of cavity 104 (e.g., an electrode positioned near the surface of the cavity 104 and insulated from first liquid 106, as described herein) to increase or decrease the wettability of the surface of the cavity 104 with respect to the first liquid 106 and change the shape of interface 110. In some embodiments, adjusting interface 110 changes the shape of the interface, which changes the focal length or focus of liquid lens 100. For example, such a change of focal length can enable liquid lens 100 to perform an autofocus function. Additionally, or alternatively, adjusting interface 110 tilts the interface relative to a structural axis 112 of liquid lens 100 (e.g., to tilt an optical axis of liquid lens 100 relative to the structural axis of liquid lens 100). For example, such tilting can enable liquid lens 100 to perform an optical image stabilization (OIS) function. Adjusting interface 110 can be achieved without physical movement of liquid lens 100 relative to an image sensor, a fixed lens or lens stack, a housing, or other components of a camera module in which liquid lens 100 can be incorporated.

In some embodiments, lens body 102 of liquid lens 100 can include a first window 114 and a second window 116. In some of such embodiments, cavity 104 can be disposed between first window 114 and second window 116. In some embodiments, lens body 102 can include a plurality of layers that cooperatively form the lens body 102. For example, in the embodiments shown in FIG. 1, lens body 102 can include a first outer layer, or first substrate, 118, an intermediate layer, or second substrate, 120, and a second outer layer, or third substrate, 122. In some embodiments, third substrate 122 can be a glass. Third substrate 122 can include a central portion 122B and a peripheral portion 122A. In some embodiments, central portion 122B can coincide with second window 116. In some embodiments, as shown in FIG. 1, lens body 102 can include a top anti-reflection (AR) coating 119 on an exterior surface of first substrate 118 and a bottom AR coating 117 on an exterior surface of third substrate 122. Bottom AR coating 117 can include an exterior side 117A (e.g., lower surface of lens body 102) and an interior side 117B (e.g., facing second liquid 108). In some embodiments, second substrate 120 can include a bore formed therethrough. For example, second substrate 120 can include cavity 104. First substrate 118 can be bonded to one side (e.g., the object side) of second substrate 120. For example, first substrate 118 can be bonded to second substrate 120 at a bond 134A. Bond 134A can be an adhesive bond, a laser bond (e.g., a laser weld), or another suitable bond capable of maintaining first liquid 106 and second liquid 108 within cavity 104 (e.g., sealing first liquid 106 and second liquid 108 within cavity 104, or hermetically sealing cavity 104). Additionally, or alternatively, third substrate 122 can be bonded to the other side (e.g., the image side) of second substrate 120 (e.g., opposite first substrate 118). For example, third substrate 122 (e.g., peripheral portion 122A) can bonded to second substrate 120 at a bond 134B and/or a bond 134C, each of which can be configured as described herein with respect to bond 134A. In some embodiments, second substrate 120 can be disposed between first substrate 118 and third substrate 122, the bore in second substrate 120 can be covered on opposing sides by first substrate 118 and third substrate 122, and at least a portion of cavity 104 can be defined within the bore. Thus, a portion of first substrate 118 covering cavity 104 serves as first window 114, and a portion of third substrate 122 covering cavity 104 serves as second window 116.

In some embodiments, cavity 104 can be defined by the bore in second substrate 120. In some embodiments, cavity 104 can be tapered as shown in FIG. 1 such that a cross-sectional area of at least a portion of the cavity decreases along structural axis 112 in a direction from the object side (e.g., first substrate 118) toward the image side (e.g., third substrate 122). For example, cavity 104 can include a narrow end 105A and a wide end 105B. The terms "narrow" and "wide" are relative terms, meaning the narrow end is narrower, or has a smaller width or diameter, than the wide end. Such a tapered cavity 104, or a portion thereof can have a substantially truncated conical cross-sectional shape. Additionally, or alternatively, such a tapered cavity 104 can help to maintain alignment of interface 110 between first liquid 106 and second liquid 108 along structural axis 112. In other embodiments, cavity 104 can be tapered such that the cross-sectional area of cavity 104 increases along structural axis 112 in the direction from the object side (e.g., first substrate 118) to the image side (e.g., third substrate 122) or non-tapered such that the cross-sectional area of cavity 104 remains substantially constant along structural axis 112. In some embodiments, cavity 104 can be rotationally symmetrical (e.g., about structural axis 112 of liquid lens 100).

In some embodiments, image light can enter liquid lens 100 through first window 114, can be refracted at interface 110 between first liquid 106 and second liquid 108, and can exit liquid lens 100 through second window 116. In some embodiments, first substrate 118 and/or third substrate 122 can include a sufficient transparency to enable passage of the image light. For example, first substrate 118 and/or third substrate 122 can include a polymeric, glass, ceramic, glass-ceramic material, or the like. In some embodiments, outer surfaces of first substrate 118 and/or third substrate 122 can be substantially planar. Thus, even though liquid lens 100 can function as a lens (e.g., by refracting image light passing through interface 110), outer surfaces of liquid lens 100 can be flat as opposed to being curved like the outer surfaces of a fixed lens. Such planar outer surfaces can make integrating liquid lens 100 into an optical assembly (e.g., a lens stack) less difficult. In other embodiments, outer surfaces of the first substrate 118 and/or the third substrate 122 are curved (e.g., concave or convex). Thus, liquid lens 100 can include an integrated fixed lens. In some embodiments, second substrate 120 can include a metallic, polymeric, glass, ceramic, glass-ceramic material, or the like. Because image light can pass through the bore (e.g., cavity 104) in second substrate 120, second substrate 120 may or may not be transparent.

Although lens body 102 of liquid lens 100 is described as including first substrate 118, second substrate 120, and third substrate 122, other embodiments are included in this disclosure. For example, in some other embodiments, one or more of the layers can be omitted. For example, the bore in second substrate 120 can be configured as a blind hole that does not extend entirely through second substrate 120, and third substrate 122 can be omitted.

In some embodiments, liquid lens 100 can include a common electrode 124 in electrical communication with first liquid 106. Additionally, or alternatively, liquid lens 100 can include a driving electrode 126 disposed on a sidewall 140 of cavity 104 and insulated from first liquid 106 and second liquid 108. Different voltages can be supplied to common electrode 124 and driving electrode 126 (e.g., different potentials can be supplied between common electrode 124 and driving electrode 126) to change the shape of interface 110 as described herein.

In some embodiments, liquid lens 100 can include a conductive layer 128, at least a portion of which is disposed within cavity 104 and/or defines at least a portion of the sidewall 140 of the cavity 104. For example, conductive layer 128 can include a conductive coating applied to second substrate 120 prior to bonding first substrate 118 and/or third substrate 122 to second substrate 120. Conductive layer 128 can include a metallic material, a conductive polymer material, another suitable conductive material, or a combination thereof. Additionally, or alternatively, conductive layer 128 can include a single layer or a plurality of layers, some or all of which can be conductive. In some embodiments, conductive layer 128 can define common electrode 124 and/or driving electrode 126. For example, conductive layer 128 can be applied to substantially the entire outer surface of second substrate 120 prior to bonding first substrate 118 and/or third substrate 122 to second substrate 120. Following application of conductive layer 128 to second substrate 120, conductive layer 128 can be segmented into various conductive elements (e.g., common electrode 124, driving electrode 126, and/or other electrical devices). In some embodiments, liquid lens 100 can include one or more scribes 130 in conductive layer 128 to isolate (e.g., electrically isolate) common electrode 124 and driving electrode 126 from each other. For example, scribe 130A can be formed by a photolithographic process, a laser process (e.g., laser ablation), or another suitable scribing process. In some embodiments, scribes 130 can include a gap in conductive layer 128. For example, scribe 130A can be a gap with a width of about 5 μm, about 10 μm, about 15 μm, about 20 μm, about 25 μm, about 30 μm, about 35 μm, about 40 μm, about 45 μm, about 50 μm, or any ranges defined by the listed values.

Although conductive layer 128 is described in reference to FIG. 1 as being segmented following application to second substrate 120, other embodiments are included in this disclosure. For example, in some embodiments, conductive layer 128 can be patterned during application to second substrate 120. For example, a mask can be applied to second substrate 120 prior to applying conductive layer 128 such that, upon application of conductive layer 128, masked regions of second substrate 120 covered by the mask can correspond to the gaps in conductive layer 128, and upon removal of the mask, the gaps are formed in conductive layer 128.

In some embodiments, liquid lens 100 can include an insulating layer 132 disposed within cavity 104. For example, insulating layer 132 can include an insulating coating applied to second substrate 120 prior to bonding first substrate 118 and/or third substrate 122 to second substrate 120. In some embodiments, insulating layer 132 can include an insulating coating applied to conductive layer 128 and second window 116 after bonding third substrate 122 to second substrate 120 and prior to bonding first substrate 118 to second substrate 120. Thus, insulating layer 132 can cover at least a portion of conductive layer 128 within cavity 104 (e.g., driving electrode 126) and second window 116. In some embodiments, insulating layer 132 can be sufficiently transparent to enable passage of image light through second window 116 as described herein. Insulating layer 132 can include polytetrafluoroethylene (PTFE), parylene, another suitable polymeric or non-polymeric insulating material, or a combination thereof. Additionally, or alternatively, insulating layer 132 can include a hydrophobic material. Additionally, or alternatively, insulating layer 132 can include a single layer or a plurality of layers, some or all of which can be insulating.

In some embodiments, insulating layer 132 can cover at least a portion of driving electrode 126 (e.g., the portion of the driving electrode disposed within cavity 104) to insulate first liquid 106 and second liquid 108 from driving electrode 126. Additionally, or alternatively, at least a portion of common electrode 124 can be disposed within cavity 104 and uncovered by insulating layer 132. Thus, common electrode 124 can be in electrical communication with first liquid 106 as described herein. In some embodiments, insulating layer 132 can include a hydrophobic surface layer in cavity 104. Such a hydrophobic surface layer can help to maintain second liquid 108 within a lower portion of cavity 104 (e.g., by attraction between the non-polar second liquid 108 and the hydrophobic material) and/or enable the perimeter of interface 110 to move along the hydrophobic surface layer (e.g., by electrowetting) to change the shape of the interface 110 as described herein.

In some embodiments, liquid lens 100 can include bottom and top AR coatings 117, 119 on third and first substrates 122, 118, respectively. For example, as shown in FIG. 1, bottom AR coating 117 can extend along the exterior surface of third substrate 122 in both the peripheral and central portions 122A, 122B. In some embodiments, bottom and top AR coatings 117, 119 can include a stack configured to reduce reflection for a wavelength range, for example, via destructive interference of multiple layers. For example, the stack can include alternating conductive (e.g., Cr) and non-conductive (e.g., $CrO_x$) layers. The stack can include any number of layers (e.g., 10 layers) to achieve the desired optical performance. In some embodiments, the stack has a stack thickness of about 50 nm to about 200 nm. In some embodiments, the stack can include low refractive index (e.g., $SiO_2$, $MgF_2$, $Al_2O_x$, porous ITO) and high refractive index (e.g., $TiO_2$, $CeO_2$, $SiN_x$, ZnS, ITO, $Ta_2O_5$) layers. For example, the stack can include alternating dielectric layers (e.g., $SiO_2/TiO_2$, $MgF_2/CeO_2$, $SiN_x/SiO_2$, $MgF_2/ZnS$, $MgF_2/SiN_x$, $SiO_x/ITO$, $TiO_2/Al_2O_x$, $MgF_2/Ta_2O_5$, etc.), microstructures (e.g., porous silica), nanostructures (e.g., porous silica, Si pyramidal texturing, $SiO_2$ nanorods), plasmonic layers, metamaterials, and/or mixtures thereof.

Figure 2:
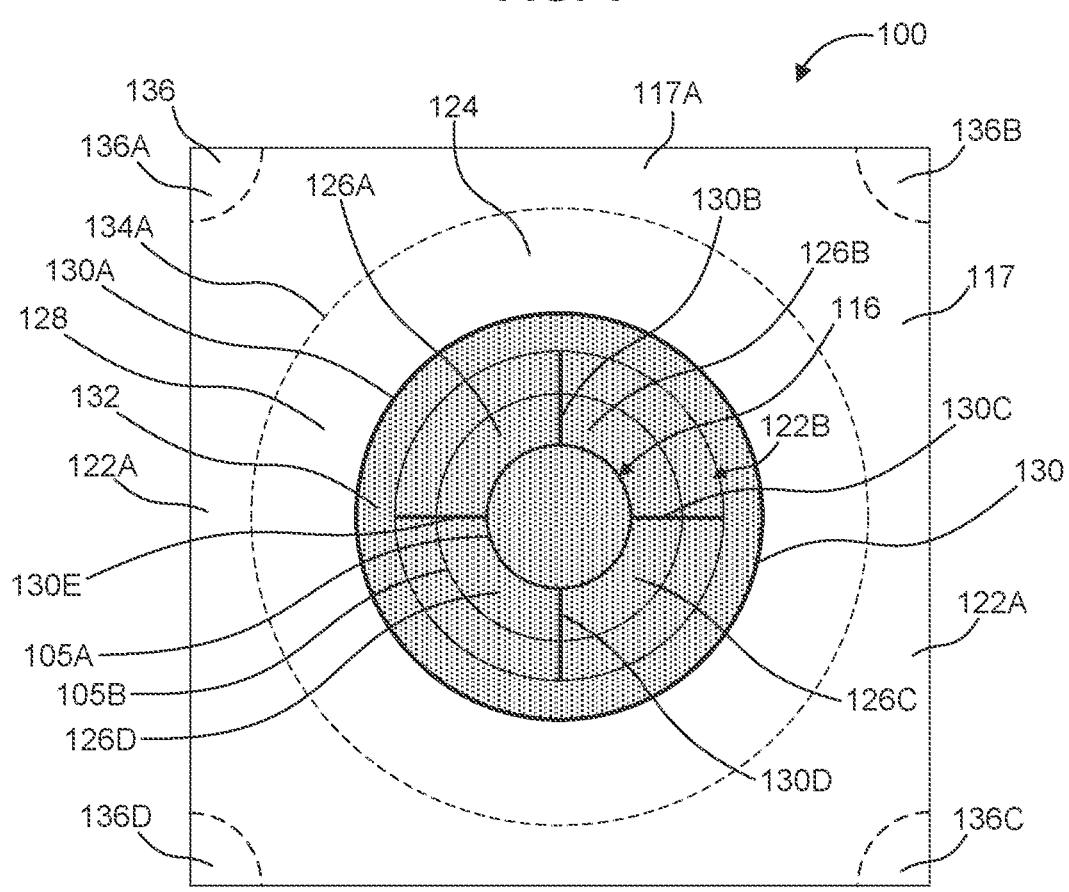
FIG. 2 is a schematic bottom plan view of the liquid lens of FIG. 1, according to exemplary embodiments.

FIG. 2 illustrates a schematic bottom plan view of liquid lens 100 shown in FIG. 1, looking through third substrate 122 and bottom AR coating 117, according to exemplary embodiments. For clarity in FIG. 2, and with some exceptions, bonds (e.g., 134A, 134B, 134C) generally are shown in dashed lines, scribes (e.g., 130, 130A, 130B, 130C, 130D, 130E) generally are shown in heavier lines, and other features generally are shown in lighter lines.

In some embodiments, common electrode 124 is defined between scribe 130A and an outer edge of liquid lens 100. A portion of common electrode 124 can be uncovered by insulating layer 132 such that common electrode 124 can be in electrical communication with first liquid 106 as described herein. In some embodiments, bond 134A can be configured such that electrical continuity can be maintained between the portion of conductive layer 128 inside the bond (e.g., inside cavity 104 and/or between the bond and scribe 130A) and the portion of conductive layer 128 outside the bond (e.g., outside cavity 104 and/or outside the bond). In some embodiments, liquid lens 100 can include one or more cutouts 136 in first substrate 118 and/or in third substrate 122. For example, as shown in FIG. 2, liquid lens 100 can include a first cutout 136A, a second cutout 136B, a third cutout 136C, and a fourth cutout 136D. In some embodiments, cutouts 136 can include portions of liquid lens 100 at which first substrate 118, second substrate 120, and/or third substrate 122 is removed to expose conductive layer 128. Thus, cutouts 136 can enable electrical connection to common electrode 124, and the regions of conductive layer 128 exposed at the cutouts can serve as contacts to enable electrical connection of liquid lens 100 to a controller, a processor, a driver, or another component of a lens or camera system.

Although cutouts 136 are described herein as being positioned at corners of liquid lens 100, other embodiments are included in this disclosure. For example, in some embodiments, one or more of the cutouts 136 can be disposed inboard of the outer perimeter of liquid lens 100 and/or along one or more edges of liquid lens 100.

In some embodiments, driving electrode 126 can include a plurality of driving electrode segments. For example, as shown in FIG. 2, driving electrode 126 can include a first driving electrode segment 126A, a second driving electrode segment 126B, a third driving electrode segment 126C, and a fourth driving electrode segment 126D. In some embodiments, the driving electrode segments 126A-126D can be distributed substantially uniformly about sidewall 140 of cavity 104. For example, each driving electrode segment can occupy about one quarter, or one quadrant, of sidewall 140 of cavity 104. In some embodiments, adjacent driving electrode segments 126A-126D are isolated from each other by a scribe. For example, first driving electrode segment 126A and second driving electrode segment 126B can be isolated from each other by scribe 130B. Additionally, or alternatively, second driving electrode segment 126B and third driving electrode segment 126C are isolated from each other by a scribe 130C. Additionally, or alternatively, third driving electrode segment 126C and fourth driving electrode segment 126D are isolated from each other by a scribe 130D. Additionally, or alternatively, fourth driving electrode segment 126D and first driving electrode segment 126A are isolated from each other by a scribe 130E. The various scribes 130 can be configured as described herein in reference to scribe 130A. In some embodiments, the scribes between the various electrode segments extend beyond cavity 104 and onto the back side of liquid lens 100 (not shown). Such a configuration can ensure electrical isolation of the adjacent driving electrode segments 126A-126D from each other. Additionally, or alternatively, such a configuration can enable each driving electrode segment 126A-126D to have a corresponding contact for electrical connection as described herein.

Although driving electrode 126 is described herein as being divided into four driving electrode segments 126A-126D, other embodiments are included in this disclosure. In some other embodiments, driving electrode 126 can include a single driving electrode (e.g., substantially circumscribing sidewall 140 of cavity 104). For example, the liquid lens comprising such a single driving electrode can be capable of varying focal length, but incapable of tilting the interface (e.g., an autofocus only liquid lens). In some other embodiments, the driving electrode 126 can be divided into two, three, five, six, seven, eight, or more driving electrode segments (e.g., distributed substantially uniformly about sidewall 140 of cavity 104).

In some embodiments, bond 134B and/or bond 134C can be configured such that electrical continuity is maintained between the portion of conductive layer 128 inside the respective bond and the portion of the conductive layer outside the respective bond. In some embodiments, liquid lens 100 can include one or more cutouts 136 in third substrate 122. For example, as shown in FIG. 2, liquid lens 100 can include cutouts 136A-136D in third substrate 122. In some embodiments, cutouts 136 can include portions of liquid lens 100 at which third substrate 122 is removed to expose conductive layer 128. Thus, cutouts 136 can enable electrical connection to driving electrode 126, and the regions of conductive layer 128 exposed at cutouts 136 can serve as contacts to enable electrical connection of liquid lens 100 to a controller, a processor, a driver, or another component of a lens or camera system.

Different driving voltages can be supplied to different driving electrode segments to tilt the interface of liquid lens 100 (e.g., for OIS functionality). For example, tilting interface 110 can cause an angle to be formed between the optical axis of liquid lens 100 (e.g., the optical axis of interface 110) and structural axis 112 of liquid lens 100. In some embodiments, such an angle can be referred to as a mechanical tilt angle, and an optical tilt angle of liquid lens 100 can be determined by multiplying the mechanical tilt angle by the refractive index difference Δn between first liquid 106 and second liquid 108. Additionally, or alternatively, a driving voltage can be supplied to a single driving electrode or the same driving voltage can be supplied to each driving electrode segment to maintain interface 110 of liquid lens 100 in a substantially spherical orientation about structural axis 112 (e.g., for autofocus functionality) and/or to maintain the optical axis in alignment with structural axis 112.

In some embodiments, third substrate 122 can include a peripheral portion 122A and a central portion 122B, as shown in FIG. 1. For example, peripheral portion 122A can be disposed laterally outboard (or farther from structural axis 112) of central portion 122B. In some embodiments, central portion 122B can include second window 116. For example, central portion 122B can at least partially overlie cavity 104, whereby at least a portion of central portion 122B of third substrate 122 can serve as second window 116. In some embodiments, peripheral portion 122A of third substrate 122 can be bonded to second substrate 120 (e.g., at bond 134C) as described herein. In some embodiments, third substrate 122 can include a monolithic or unitary body (e.g., formed from a single piece of material such as, for example, a glass substrate). For example, each of peripheral portion 122A and central portion 122B can be part of the monolithic third substrate 122.

In some embodiments, a thickness of peripheral portion 122A of third substrate 122 is substantially the same as a thickness of central portion 122B and/or second window 116. Additionally, or alternatively, a substantially uniform thickness of peripheral portion 122A and central portion 122B and/or second window 116, can enable third substrate 122 to be formed from a substantially planar sheet of material without thinning the central portion 122B and/or the second window 116 (e.g., without etching, grinding, or polishing the central portion and/or the first window to reduce the thickness thereof). Avoiding such a thinning step can help to maintain the surface quality of second window 116, which can improve the image quality of liquid lens 100 compared to liquid lenses with thinned window regions. Additionally, or alternatively, avoiding such a thinning step can reduce the number of steps involved in manufacturing third substrate 122 compared to liquid lenses with thinned window regions, thereby simplifying production of liquid lens 100. In some embodiments, a thickness of third substrate 122 can be about 25 μm to about 250 μm. For example, central portion 122B and/or second window 116 can have a thickness of about 25 μm to about 50 μm.

In some embodiments, cavity 104 can include a sidewall 140 extending between first substrate 118 and second window 116. For example, sidewall 140 can be defined by the bore in second substrate 120 (e.g., a wall of the bore) and/or conductive layer 128 (e.g., a portion of the conductive layer disposed on a portion of the wall of the bore). In some embodiments, sidewall 140 can be straight (e.g., along the sidewall of cavity 104 in the axial direction). For example, the deviation of sidewall 140 from linear, measured along an entire height of the sidewall in the axial direction, is at most about 50 μm, at most about 40 μm, at most about 30 μm, at most about 20 μm, at most about 10 μm, at most about 5 μm, or any ranges defined by the listed values.

Exemplary Liquid Lens with Integrated Chipless RFID

As discussed above, liquid lenses can be manufactured by microfabrication on wafers. Fabricated wafers tend to be grouped into lots. Tracking individual wafers within each lot can be difficult, for example, if there is manual handling (e.g., analysis, damage, breakage, etc.) of one or more wafers in the lot. Maintaining accurate wafer tracking can include manual or automated inspection of each wafer.

Additionally, when a wafer is diced, tracking of the individual die of the wafer can be extremely difficult, for example, due to the increase of individual dice and decrease in size. Each die can include a unique identification (ID) mark (e.g., 2D barcode, alphanumeric, etc.). As a consequence, due to the small size of each die, tracking of individual dice can involve substantial time and resources, for example, through manual inspection (e.g., optical microscope) and/or automated inspection (e.g., optical character recognition (OCR)). Accordingly, there is a need for an RFID tag that can be integrated into a liquid lens, for example, in an anti-reflection (AR) coating of the liquid lens, and provide efficient and reliable tracking of the liquid lens throughout fabrication and packaging.

An RFID tag can contain stored electronic information and can use electromagnetic (EM) fields to automatically identify and track the RFID tag on an object. Active tags have a local power source (e.g., integrated circuit (IC) chip) connected to the RFID tag and can be operated away from an RFID reader. Passive tags do not have a local power source (e.g., chipless) connected to the RFID tag and collect energy from an RFID reader's interrogation signal (e.g., radio frequency (RF) wave). A chipless RFID tag system has several advantages: (1) significantly reduced cost (e.g., does not require an IC chip); (2) line of site between RFID reader and chipless RFID tag is not required (e.g., RFID reader can be installed on production line); (3) RFID reader can be spaced some distance away from the chipless RFID tag (e.g., RFID reader can be suspended above production line); and (4) multiple chipless RFID tags can be read simultaneously (e.g., unique signature for each chipless RFID tag).

Chipless RFID tags can use time-domain reflectometry (e.g., RFID reader sends interrogation signal and listens for echoes over time) and/or frequency signature techniques (e.g., RFID reader sends a broadband interrogation signal and listens for the echoes' frequency response). For example, the chipless RFID tag can be designed as a resonant circuit to attenuate or absorb radiation of a particular frequency. Passive antennas can be included in the chipless RFID tag (e.g., a planar conductor) and connected to resonant structures to receive and send signals to and from the RFID reader. For example, an RFID reader can send a coherent interrogation pulse and receive an interference pattern from the chipless RFID tag, based on the resonant structures, that can be decoded to identify the unique tag.

Figure 3:
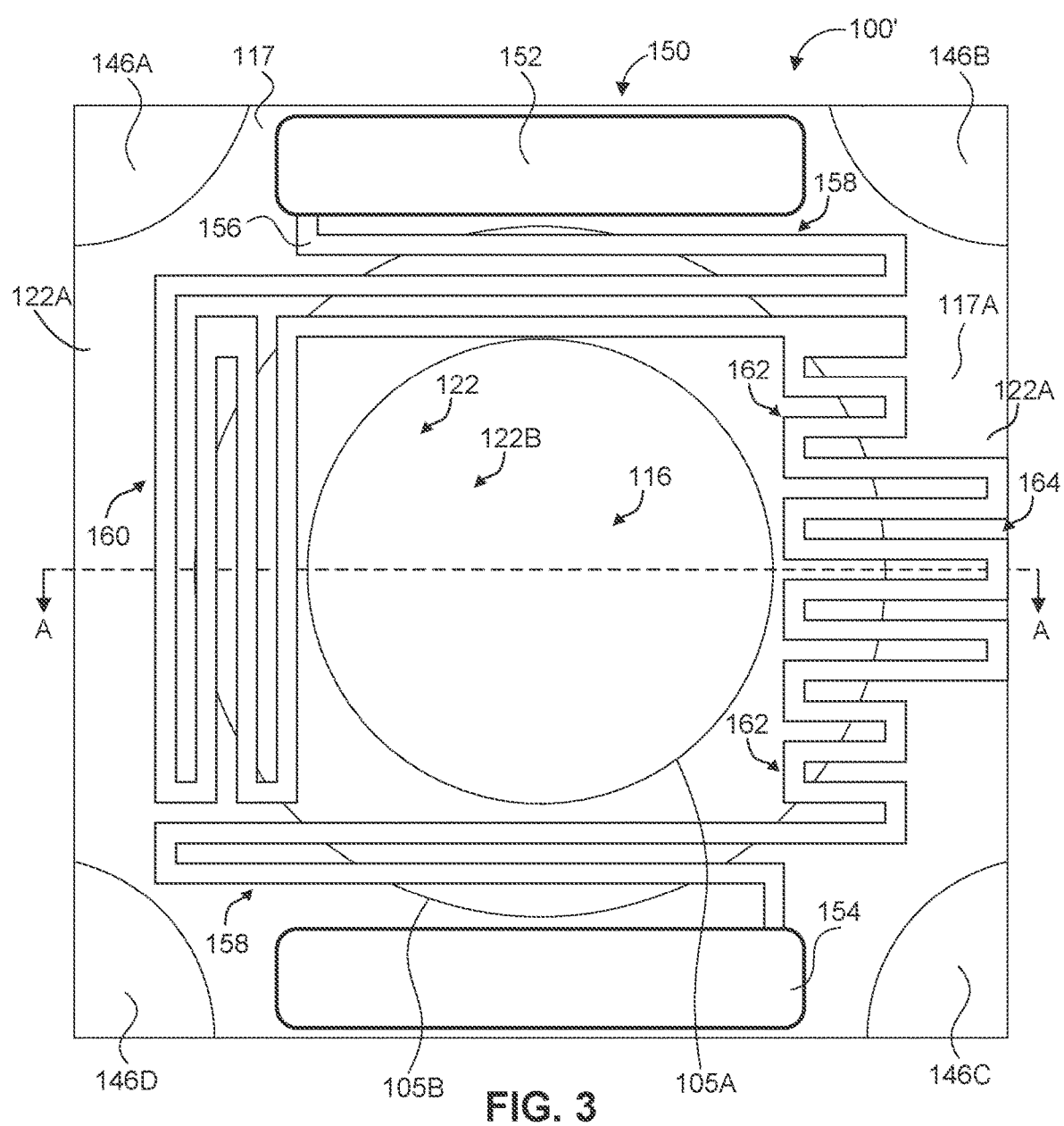
FIG. 3 is a schematic bottom plan view of a liquid lens with an integrated chipless RFID tag, according to exemplary embodiments.
Figure 3A:
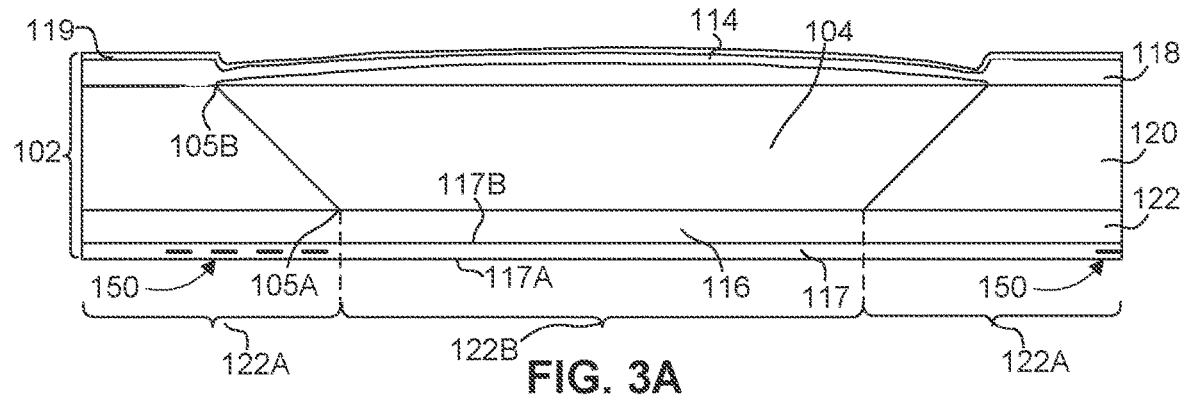
FIG. 3A is a schematic cross-sectional view of the liquid lens of FIG. 3, according to exemplary embodiments.

FIG. 3 illustrates a schematic bottom plan view of liquid lens 100', according to some embodiments. FIG. 3A illustrates a schematic cross-sectional view of liquid lens 100' as shown in FIG. 3, according to some embodiments. The embodiments of liquid lens 100 shown in FIGS. 1 and 2 and the embodiments of liquid lens 100' shown in FIGS. 3 and 3A may be similar. Similar reference numbers are used to indicate similar features of the embodiments of liquid lens 100 shown in FIGS. 1 and 2 and the similar features of the embodiments of liquid lens 100' shown in FIGS. 3 and 3A. The main differences between the embodiments of liquid lens 100 shown in FIGS. 1 and 2 and the embodiments of liquid lens 100' shown in FIGS. 3 and 3A are that liquid lens 100' includes a chipless RFID tag 150 (e.g., first antenna 152, second antenna 154, resonator 156, etc.) integrated in bottom AR coating 117 atop third substrate 122 and may be configured to uniquely identify liquid lens 100' and/or passively communicate with an RFID reader.

As shown in FIGS. 3 and 3A, liquid lens 100' can include third substrate 122, bottom AR coating 117, and chipless RFID tag 150. Similar to liquid lens 100 shown in FIGS. 1 and 2, third substrate 122 can include peripheral portion 122A and central portion 122B, and bottom AR coating 117 can be disposed atop third substrate 122 and include exterior side 117A and interior side 117B. Central portion 122B can include or coincide with second window 116. Peripheral portion 122A can be separated along narrow end 105A of cavity 104. Peripheral portion 122A can include chipless RFID tag 150. As shown in FIG. 3, liquid lens 100' can include first contact pad 146A, second contact pad 146B, third contact pad 146C, and/or fourth contact pad 146D for various electrical connections to other components of liquid lens 100' (e.g., cutouts 136A-136D shown in FIG. 2).

Chipless RFID tag 150 can be configured to uniquely identify liquid lens 100'. For example, chipless RFID tag 150 can receive an interrogation signal from an RFID reader and send back a unique signature (e.g., resonant frequency) to the RFID reader based on the structure of the chipless RFID tag 150. Chipless RFID tag 150 can passively receive and send signals to and from an RFID reader to uniquely identify liquid lens 100' and/or a wafer. Chipless RFID tag 150 can be a conductor or an insulator. In some embodiments, chipless RFID tag 150 can be a planar conductor (e.g., copper, aluminum, another metal, etc.). In some embodiments, as shown in FIG. 3A, chipless RFID tag 150 can be embedded (e.g., disposed, integrated, etc.) in bottom AR coating 117. For example, the embedded chipless RFID tag 150 can comprise one or more layers of a stack of bottom AR coating 117 patterned to passively receive and send signals, as described herein. In some embodiments, the embedded chipless RFID tag 150 can be integrated with a first layer of a stack of bottom AR coating 117. For example, the first layer can be conductive (e.g., Cr) and form chipless RFID tag 150.

Although FIG. 3A shows chipless RFID tag 150 embedded in bottom AR coating 117, other embodiments are included in this disclosure. For example, in some embodiments, chipless RFID tag 150 is disposed on exterior side 117A of bottom AR coating 117. Additionally, or alternatively, chipless RFID tag 150 is disposed on interior side 117B of bottom AR coating 117.

In some embodiments, as shown in FIG. 3, chipless RFID tag 150 can be disposed in peripheral portion 122A and surround a majority of second window 116. In some embodiments, similar to FIG. 3A, chipless RFID tag 150 can be embedded in top AR coating 119 (not shown), disposed on an exterior side of top AR coating 119 (not shown), or disposed on an interior side of top AR coating 119 (not shown). In some embodiments, as shown in FIG. 3, chipless RFID tag 150 can include a planar transmission line (e.g., first antenna 152, second antenna 154, resonator 156).

In some embodiments, chipless RFID tag 150 can include one or more antennas (e.g., planar conductor) to passively receive and send signals to and from an RFID reader. For example, as shown in FIG. 3, chipless RFID tag 150 can include a first antenna 152 (e.g., Rx receiver) and a second antenna 154 (e.g., Tx transmitter). First antenna 152 can be configured to receive an interrogation signal (e.g., RF wave) from an RFID reader and second antenna 154 can be configured to send a unique encoded signal (e.g., resonant frequency signature) back to the RFID reader. Electromagnetic (EM) radiation can be polarized (e.g., confinement of electric field or magnetic field of EM radiation to a plane of polarization) along a propagation direction. Polarization can be linear (e.g., horizontal, vertical), circular (e.g., clockwise, counterclockwise), or elliptical (e.g., clockwise, counterclockwise). The polarization of EM radiation can be measured, for example, by passing EM radiation through an adjustable polarizer (e.g., linear polarizer) and observing transmission of the EM radiation on a detector (e.g., photodetector, photodiode, etc.) as the transmission axis of the adjustable polarizer is rotated. In some embodiments, first and second antennas 152, 154 can each include a polarizer (e.g., reflective polarizer, dichroic polarizer, birefringent polarizer, etc.). In some embodiments, first antenna 152 can have a first polarization (e.g., linear) and second antenna 154 can have a second polarization (e.g., linear) substantially orthogonal or orthogonal to the first polarization to enhance signal strength and detection between chipless RFID tag 150 and an RFID reader. For example, for linear antenna polarization, first antenna 152 can include a first linear polarizer (e.g., wire grid, patterned dielectric, nanoparticles, etc.) that is horizontally polarized (e.g., 0 degrees) and second antenna 154 can include a second linear polarizer (e.g., wire grid, patterned dielectric, nanoparticles, etc.) that is vertically polarized (e.g., 90 degrees).

As shown in FIG. 3, first and second antennas 152, 154 can have a rectangular shape and be disposed at opposite ends of liquid lens 100'. In some embodiments, first and second antennas 152, 154 can each have a thickness of about 50 nm to about 200 nm. For example, first and second antennas 152, 154 can each have a thickness of about 100 nm. In some embodiments, first and second antennas 152, 154 can each have an area of about 25 $\mu m^2$ to about 150 $\mu m^2$. For example, first and second antennas 152, 154 can each have an area of about 50 $\mu m^2$. First and second antennas 152, 154 can each be a planar conductor (e.g., copper, aluminum, etc.). In some embodiments, first and second antennas 152, 154 can each be configured to receive and transmit RF signals having a frequency of about 1 MHz to about 50 GHz. For example, chipless RFID tag 150 and an RFID reader can communicate with RF signals having a frequency of about 1 GHz to about 50 GHz. In some embodiments, as shown in FIG. 3, first and second antennas 152, 154 can be electrically connected to resonator 156 as described herein.

In some embodiments, chipless RFID tag 150 can include a resonator 156. For example, resonator 156 comprises a resonating structure (e.g., suspended arrangement, patterned platform, microelectromechanical system (MEMS), etc.) that can oscillate at one or more resonant frequencies to provide one or more unique resonant frequencies for chipless RFID tag 150. Resonator 156 can be actuated or driven by applied EM radiation. As shown in FIG. 3, resonator 156 can include first resonator 158, second resonator 160, third resonator 162, and/or fourth resonator 164. First resonator 158, second resonator 160, third resonator 162, and/or fourth resonator 164 can each have a unique resonant frequency based on its shape (e.g., thickness, length, width, etc.). Resonator 156 can be a planar conductor (e.g., copper, aluminum, etc.). In some embodiments, resonator 156 can be configured to provide a resonant frequency signature of one or more resonant frequencies of about 1 MHz to about 50 GHz (e.g., to second antenna 154). For example, first resonator 158 can have a resonant frequency of about 50 MHz, second resonator 160 can have a resonant frequency of about 100 MHz, third resonator 162 can have a resonant frequency of about 10 GHz, and fourth resonator 164 can have a resonant frequency of about 1 GHz.

As shown in FIG. 3, resonator 156 can have a serpentine shape and be disposed between first and second antennas 152, 154 in peripheral portion 122A (e.g., outside of second window 116). In some embodiments, resonator 156 can have a thickness of about 50 nm to about 200 nm. For example, resonator 156 can have a thickness of about 100 nm. In some embodiments, resonator 156 can have a width of about 1 $\mu m$ to about 50 $\mu m$. For example, resonator 156 can have a width of about 10 $\mu m$. In some embodiments, resonator 156 can have a length of about 50 mm to about 150 mm. For example, resonator 156 can have a length of about 100 mm. In some embodiments, as shown in FIG. 3, resonator 156 can be continuous. In some embodiments, resonator 156 can have one or more serpentine shapes to form one or more resonators (e.g., first resonator 158, second resonator 160, third resonator 162, and/or fourth resonator 164).

In some embodiments, first and second antennas 152, 154 and resonator 156 can include a similar material. For example, first and second antennas 152, 154 and resonator 156 can include a metal, doped polysilicon, a semiconductor, a piezoelectric, or any combination thereof. In some embodiments, as shown in FIG. 3, central portion 122B can include second window 116 and chipless RFID tag 150 can be disposed in peripheral portion 122A. For example, chipless RFID tag 150 can be disposed on exterior side 117A of bottom AR coating 117. Additionally, or alternatively, chipless RFID tag 150 can be disposed on interior side 117B of bottom AR coating 117. In some embodiments, chipless RFID tag 150 can be disposed in an area outside of first window 114 and wide end 105B. For example, chipless RFID tag 150 can be disposed on an exterior side of top AR coating 119. Additionally, or alternatively, chipless RFID tag 150 can be disposed on an interior side of top AR coating 119.

Exemplary Liquid Lens Tracking System

Figure 4:
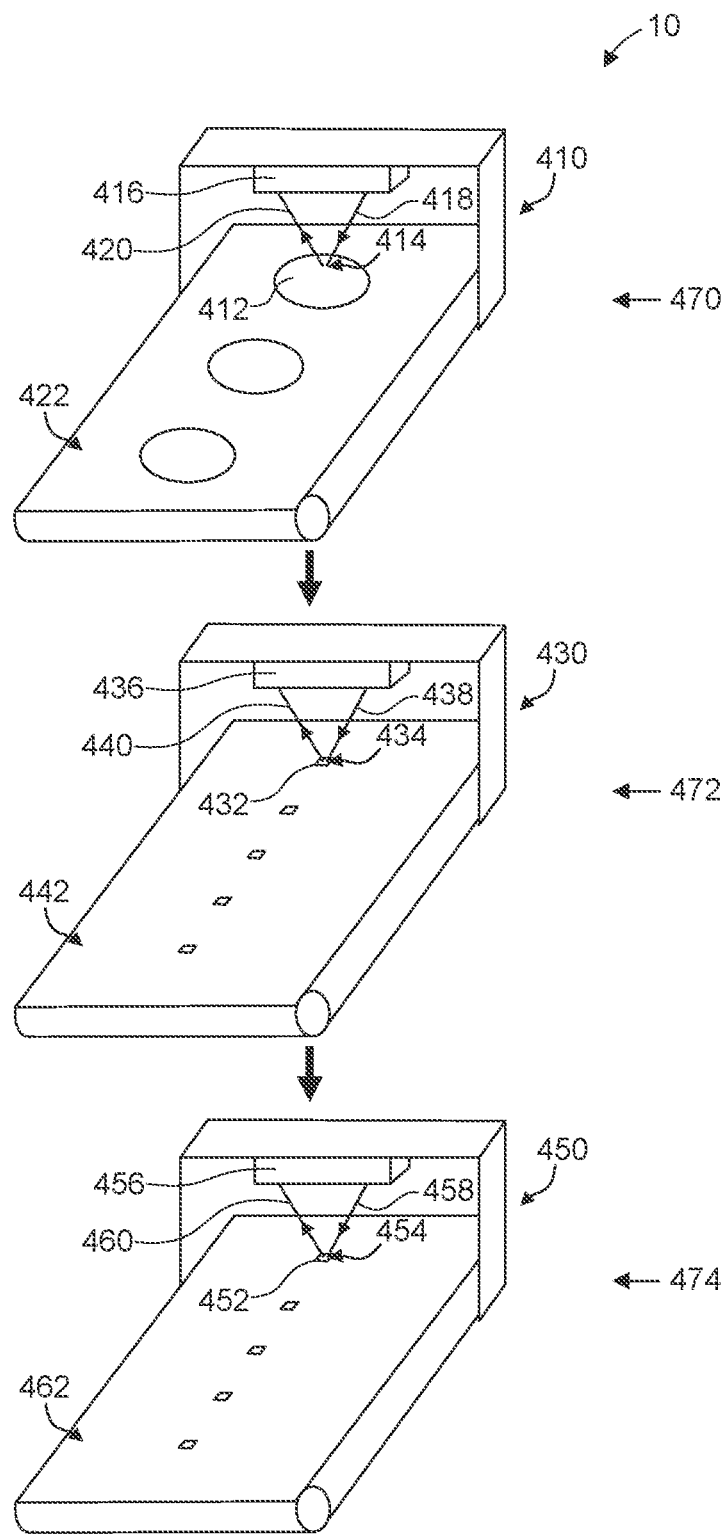
FIG. 4 is a schematic perspective view and operation of a liquid lens tracking system, according to exemplary embodiments.

FIG. 4 illustrates a schematic perspective view of liquid lens tracking system 10, according to some embodiments. In some embodiments, liquid lens tracking system 10 can include a chipless RFID tag (e.g., chipless RFID tag 150) and an RFID reader (e.g., first RFID reader 416, second RFID reader 436, third RFID reader 456). Liquid lens tracking system 10 can be configured to track a wafer (e.g., wafer 412), a die (e.g., die 432 including a liquid lens, e.g., liquid lens 100'), and/or a package for shipping (e.g., shipping package 452) during fabrication and/or packaging via unique chipless RFID tags. Liquid lens tracking system 10 can include wafer tracking system 410, die tracking system 430, and/or shipping package tracking system 450.

A plurality of liquid lenses (e.g., liquid lens 100') can be formed using wafer processing. For example, a plurality of bores or through holes (e.g., cavity 104) can be formed in an intermediate wafer (e.g., second substrate 120). A conductive layer (e.g., conductive layer 128) can be applied to the intermediate wafer (e.g., second substrate 120) and the conductive layer can be patterned (e.g., via photolithography) to form driving electrodes (e.g., driving electrode 126, driving electrode segments 126A-126D). A bottom side of the intermediate wafer (e.g., second substrate 120) can be bonded to a top side of a bottom wafer (e.g., third substrate 122). An insulating layer (e.g., insulating layer 132) can be applied to the cavity (e.g., cavity 104) formed by the bonded intermediate and bottom wafers (e.g., second and third substrates 120, 122) to insulate the cavity (e.g., cavity 104). The insulated cavity (e.g., cavity 104) can be filled with liquids (e.g., first and second liquids 106, 108). A top side of the intermediate wafer (e.g., second substrate 120) can be bonded to a bottom side of a top wafer (e.g., first substrate 118) to seal the liquids and form a plurality of liquid lenses (e.g., liquid lens 100').

AR coatings (e.g., bottom and/or top AR coatings 117, 119) can be applied either before or after bonding to a top side of the top wafer (e.g., first substrate 118) and/or a bottom side of the bottom wafer (e.g., second substrate 120). An AR coating (e.g., 117) can include a plurality of unique RFID tags (e.g., chipless RFID tag 150). The bonded system (e.g., first, second, and third substrates 118, 120, 122) can be diced (e.g., singulated) to form a plurality of dice (e.g., die 432) each with a liquid lens (e.g., liquid lens 100') with a unique RFID tag (e.g., chipless RFID tag 150).

As shown in FIG. 4, wafer tracking system 410 can include wafer 412, first chipless RFID tag 414, first RFID reader 416, and wafer conveyor 422. Wafer tracking system 410 can be configured to track wafer 412 during fabrication (as described herein) via a unique first chipless RFID tag 414 (e.g., chipless RFID tag 150) measured by first RFID reader 416. In some embodiments, first chipless RFID tag 414 can be similar to chipless RFID tag 150 shown in FIG. 3. Wafer 412 can be transported along wafer conveyor 422 toward first RFID reader 416 for unique identification and tracking. First RFID reader 416 can send an interrogation signal 418 (e.g., RF broadband pulse) to first chipless RFID tag 414 on wafer 412 and receive an encoded signal 420 (e.g., resonant frequency signature) from first chipless RFID tag 414. In this manner, first RFID reader 416 can uniquely identify and track wafer 412 over time.

In some embodiments, a distance between first RFID reader 416 and first chipless RFID tag 414 during an interrogation can be about 1 cm to about 100 cm. For example, the distance can be about 10 cm. In some embodiments, wafer 412 can include a plurality of wafers and first chipless RFID tag 414 can include a plurality of corresponding chipless RFID tags. For example, first RFID reader 416 can simultaneously identify and track multiple first chipless RFID tags 414 on corresponding multiple wafers 412 in real time. In some embodiments, first chipless RFID tag 414 can include a plurality of different resonators each having a unique resonant frequency (e.g., similar to chipless RFID tag 150 shown in FIG. 3). For example, first RFID reader 416 can be configured to interrogate (e.g., interrogation signal 418) and receive (e.g., encoded signal 420) a unique resonant frequency signature based on the plurality of different resonators (e.g., similar to first resonator 158, second resonator 160, third resonator 162, and/or fourth resonator 164 shown in FIG. 3).

As shown in FIG. 4, die tracking system 430 can include die 432, second chipless RFID tag 434, second RFID reader 436, and die conveyor 442. Die tracking system 430 can be configured to track die 432, for example, after dicing of wafer 412, via a unique second chipless RFID tag 434 (e.g., chipless RFID tag 150) measured by second RFID reader 436. In some embodiments, die 432 can include a liquid lens, for example, liquid lens 100'. In some embodiments, second chipless RFID tag 434 can be similar to chipless RFID tag 150 shown in FIG. 3. Die 432 can be transported along die conveyor 442 toward second RFID reader 436 for unique identification and tracking. Second RFID reader 436 can send an interrogation signal 438 (e.g., RF broadband pulse) to second chipless RFID tag 434 on die 432 and receive an encoded signal 440 (e.g., resonant frequency signature) from second chipless RFID tag 434. In this manner, second RFID reader 436 can uniquely identify and track die 432 over time.

In some embodiments, second chipless RFID tag 434 on die 432 can be the same as first chipless RFID tag 414 on wafer 412. For example, second chipless RFID tag 434 of die 432 (e.g., chipless RFID tag 150 of liquid lens 100') can be first chipless RFID tag 414 on wafer 412 and have the same unique identification. In some embodiments, first chipless RFID tag 414 on wafer 412 can be positioned outside of the array of fabricated liquid lenses (e.g., liquid lens 100'). For example, first chipless RFID tag 414 can be fabricated on a bottom handle region of wafer 412 (e.g., third substrate 122) outside the wafer fabrication area for fabricating the plurality of liquid lenses (e.g., liquid lens 100'). In some embodiments, first chipless RFID tag 414 on wafer 412 can be embedded in a conductive layer (e.g., conductive layer 128) of a wafer (e.g., second substrate 120) forming part of the bonded system as described herein.

In some embodiments, second chipless RFID tag 434 can be embedded in an AR coating on die 432. For example, second chipless RFID tag 434 (e.g., similar to chipless RFID tag 150 shown in FIG. 3) can be embedded in bottom AR coating 117 of liquid lens 100' on die 432. In some embodiments, a distance between second RFID reader 436 and second chipless RFID tag 434 during an interrogation can be about 1 mm to about 10 cm. For example, the distance can be about 1 cm. In some embodiments, die 432 can include a plurality of dice and second chipless RFID tag 434 can include a plurality of corresponding chipless RFID tags. For example, second RFID reader 436 can simultaneously identify and track multiple second chipless RFID tags 434 on corresponding multiple dice 432 in real time. In some embodiments, second chipless RFID tag 434 can include a plurality of different resonators each having a unique resonant frequency (e.g., similar to chipless RFID tag 150 shown in FIG. 3). For example, second RFID reader 436 can be configured to interrogate (e.g., interrogation signal 438) and receive (e.g., encoded signal 440) a unique resonant frequency signature based on the plurality of different resonators (e.g., similar to first resonator 158, second resonator 160, third resonator 162, and/or fourth resonator 164 shown in FIG. 3).

As shown in FIG. 4, shipping package tracking system 450 can include shipping package 452, third chipless RFID tag 454, third RFID reader 456, and shipping package conveyor 462. Shipping package tracking system 450 can be configured to track shipping package 452, for example, after packaging of die 432 for shipment, via a unique third chipless RFID tag 454 (e.g., chipless RFID tag 150) measured by third RFID reader 456. In some embodiments, shipping package 452 can include a liquid lens, for example, liquid lens 100'. For example, shipping package 452 can include liquid lens 100' disposed in a tray (e.g., plastic, cardboard, etc.) and/or a box (e.g., plastic, cardboard, etc.) for shipment. In some embodiments, third chipless RFID tag 454 can be similar to chipless RFID tag 150 shown in FIG. 3. Shipping package 452 can be transported along shipping package conveyor 462 toward third RFID reader 456 for unique identification and tracking. Third RFID reader 456 can send an interrogation signal 458 (e.g., RF broadband pulse) to third chipless RFID tag 454 on shipping package 452 and receive an encoded signal 460 (e.g., resonant frequency signature) from third chipless RFID tag 454. In this manner, third RFID reader 456 can uniquely identify and track shipping package 452 over time.

In some embodiments, third chipless RFID tag 454 can be the same as second chipless RFID tag 434. For example, third chipless RFID tag 454 of shipping package 452 can be second chipless RFID tag 434 on die 432 (e.g., chipless RFID tag 150 of liquid lens 100') and have the same unique identification after die 432 is packaged for shipment. In some embodiments, a distance between third RFID reader 456 and third chipless RFID tag 454 during an interrogation can be about 1 cm to about 100 cm. For example, the distance can be about 10 cm. In some embodiments, shipping package 452 can include a plurality of shipping packages and third chipless RFID tag 454 can include a plurality of corresponding chipless RFID tags. For example, third RFID reader 456 can simultaneously identify and track multiple third chipless RFID tags 454 on corresponding multiple shipping packages 452 in real time. In some embodiments, third chipless RFID tag 454 can include a plurality of different resonators each having a unique resonant frequency (e.g., similar to chipless RFID tag 150 shown in FIG. 3). For example, third RFID reader 456 can be configured to interrogate (e.g., interrogation signal 458) and receive (e.g., encoded signal 460) a unique resonant frequency signature based on the plurality of different resonators (e.g., similar to first resonator 158, second resonator 160, third resonator 162, and/or fourth resonator 164 shown in FIG. 3).

In some embodiments, wafer conveyor 422, die conveyor 442, and/or shipping package conveyor 462 can be a single conveyor. In some embodiments, first RFID reader 416, second RFID reader 436, and/or third RFID reader 456 can be a single RFID reader. In some embodiments, shipping package 452 can be a packaged die 432 with a liquid lens (e.g., liquid lens 100' with chipless RFID tag 150) fabricated from wafer 412 for shipment.

An exemplary operation of tracking system 10 for uniquely identifying and tracking a wafer, a die, and/or a shipping package, according to some embodiments will now be described with reference again to FIG. 4. It is to be appreciated that not all operation stages described with reference to FIG. 4 are needed to perform the disclosure provided herein. Further, some of the operation stages may be performed simultaneously, sequentially, or in a different order than shown in FIG. 4.

During operation stage 470, wafer 412 with first chipless RFID tag 414 can be tracked by first RFID reader 416 of wafer tracking system 410. In some embodiments, a liquid lens (e.g., liquid lens 100') with a second chipless RFID tag 434 (e.g., chipless RFID tag 150 as shown in FIG. 3) is fabricated on wafer 412. In some embodiments, fabricated liquid lens (e.g., liquid lens 100') on wafer 412 is diced into a die 432 with the liquid lens (e.g., liquid lens 100').

In operation stage 472, die 432 with second chipless RFID tag 434 can be tracked by second RFID reader 436 of die tracking system 430. In some embodiments, a liquid lens (e.g., liquid lens 100') with second chipless RFID tag 434 (e.g., chipless RFID tag 150 as shown in FIG. 3) is packaged to form shipping package 452.

In operation stage 474, shipping package 452 with second chipless RFID tag 434 and/or a third chipless RFID tag 454 can be tracked by third RFID reader 456 of shipping package tracking system 450. In some embodiments, third chipless RFID tag 454 can be the same as second chipless RFID tag 434. For example, third chipless RFID tag 454 of shipping package 452 can be second chipless RFID tag 434 on die 432 (e.g., chipless RFID tag 150 of liquid lens 100') and have the same unique identification after die 432 is packaged for shipment.

In some embodiments, wafer conveyor 422 of wafer tracking system 410, die conveyor 442 of die tracking system 430, and/or shipping package conveyor 462 of shipping package tracking system 450 can be a single conveyor. In some embodiments, first RFID reader 416, second RFID reader 436, and/or third RFID reader 456 can be a single RFID reader. In some embodiments, second RFID reader 436 can be third RFID reader 456. In some embodiments, shipping package 452 can be a packaged die 432 with a liquid lens (e.g., liquid lens 100' with chipless RFID tag 150) fabricated from wafer 412 for shipment. In some embodiments, tracking of wafer 412, tracking of die 432, and tracking of shipping package 452 occurs sequentially.

It is to be understood that the phraseology or terminology herein is for the purpose of description and not of limitation, such that the terminology or phraseology of the present specification is to be interpreted by those skilled in relevant art(s) in light of the teachings herein.

The term "substrate" as used herein describes a material onto which material layers can be added. In some embodiments, the substrate itself may be patterned and materials added on top of it may also be patterned, or may remain without patterning.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals, and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, and/or instructions.

The examples described herein are illustrative, but not limiting, of the embodiments of this disclosure. Other suitable modifications and adaptations of the variety of conditions and parameters normally encountered in the field, and which would be apparent to those skilled in the relevant art(s), are within the spirit and scope of the disclosure.

While specific embodiments of the disclosure have been described above, it will be appreciated that the disclosure may be practiced otherwise than as described. The description is not intended to be limiting, but rather exemplary.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein.

The breadth and scope of the present disclosure should not be limited by any of the above-described exemplary embodiments, but should be defined only in accordance with the following claims and their equivalents.

What is claimed is:

1. A method comprising:
   first tracking, with a first RFID reader, a wafer with a first chipless radio frequency (RFID) tag;
   fabricating an array of liquid lenses using the wafer, the array comprising a liquid lens with a second chipless RFID tag;
   dicing the wafer into a plurality of dice, one of which comprises the liquid lens;
   second tracking, with a second RFID reader, the second chipless RFID tag;
   packaging the die comprising the liquid lens; and
   third tracking, with a third RFID reader, the die comprising the liquid lens after packaging.

2. The method of claim 1, wherein the fabricating comprises embedding the second chipless RFID tag in an anti-reflection (AR) coating of the liquid lens.

3. The method of claim 1, wherein the fabricating comprises forming a plurality of different resonators each having a unique resonant frequency in the second chipless RFID tag.

4. The method of claim 3, wherein the first tracking comprises tracking a plurality of wafers with a plurality of the first chipless RFID tags.

5. The method of claim 3, wherein the second tracking comprises tracking a plurality of dice with a plurality of the second chipless RFID tags.

6. The method of claim 3, wherein the fabricating comprises fabricating a different second chipless RFID tag into each liquid lens of the array of liquid lenses prior to dicing the wafer.

* * * * *